(12) United States Patent
Lee et al.

(10) Patent No.: US 8,330,905 B2
(45) Date of Patent: Dec. 11, 2012

(54) LIQUID CRYSTAL DISPLAY DEVICE

(75) Inventors: Mi Kyung Lee, Gyeongbuk (KR); Hyun Suk Jin, Daegu (KR)

(73) Assignee: LG Display Co., Ltd., Seoul (KR)

( * ) Notice: Subject to any disclaimer, the term of this patent is extended or adjusted under 35 U.S.C. 154(b) by 109 days.

(21) Appl. No.: 12/979,494

(22) Filed: Dec. 28, 2010

(65) Prior Publication Data

US 2012/0062810 A1  Mar. 15, 2012

(30) Foreign Application Priority Data

Sep. 15, 2010  (KR) .................. 10-2010-0090809

(51) Int. Cl.
  *G02F 1/1335* (2006.01)
  *G02F 1/1343* (2006.01)
(52) U.S. Cl. ........................................ 349/109; 349/141
(58) Field of Classification Search .................. 349/141
See application file for complete search history.

(56) References Cited

U.S. PATENT DOCUMENTS 6,525,798 B1 * 2/2003 Yamakita et al. .............. 349/141
2006/0066780 A1 * 3/2006 Ochiai et al. .................. 349/107

* cited by examiner

*Primary Examiner* — Wen-Ying P Chen
(74) *Attorney, Agent, or Firm* — Morgan, Lewis & Bockius LLP

(57) ABSTRACT

A liquid crystal display device capable of reducing manufacturing costs is disclosed. The liquid crystal display device includes first and second substrates facing each other, a liquid crystal layer filled between the first and second substrates, a first common electrode formed in a first pixel region on the first substrate in correspondence with a first subpixel for emitting a light of a first color, and having a first area, wherein a common voltage is applied to the first common electrode, and a second common electrode formed in a second pixel region on the first substrate in correspondence with a second subpixel for emitting light of a second color different from the first color and having a second area different from the first area, wherein the common voltage is applied to the second common electrode.

9 Claims, 8 Drawing Sheets

US 8,330,905 B2

LIQUID CRYSTAL DISPLAY DEVICE

This application claims the benefit of Korean Patent Application No. 10-2010-0090809, filed on Sep. 15, 2010, which is hereby incorporated by reference as if fully set forth herein.

BACKGROUND OF THE INVENTION

1. Field of the Invention

The present invention relates to a liquid crystal display device, and more particularly, to a liquid crystal display device capable of reducing manufacturing costs.

2. Discussion of the Related Art

As the information age has arrived, a display field for visually displaying an electrical information signal has been rapidly developed. Accordingly, various flat display devices with excellent performance such as slimness, light weight and low power consumption have been rapidly developed and have replaced Cathode Ray Tubes (CRTs).

Examples of such flat display devices include a Liquid Crystal Display (LCD), an Organic Light Emitting Display (OLED), an Electrophoretic Display (EPD; an Electric Paper Display), a Plasma Display Panel (PDP), a Field Emission Display (FED), an Electroluminescent Display (ELD), an Electro-Wetting Display (EWD), and the like, each of which includes a flat display panel for displaying an image as an essential component. The flat display panel includes a pair of substrates which are adhered to each other with a light emitting layer or a polarized material layer interposed therebetween.

Among such devices, the LCD device includes a liquid crystal panel including a lower substrate, an upper substrate and a liquid crystal layer filled between the lower substrate and the upper substrate. Since the liquid crystal panel is a non light emitting element, the LCD device displays an image using light incident to the liquid crystal panel and reflected or light supplied from a backlight unit provided on a rear surface of the liquid crystal panel.

The LCD device controls the light emitted from each of a plurality of pixels in frame units so as to display an image. In order to display a color image, the LCD device includes color filter layers each of which transmits a light of a wavelength region corresponding to any one of a plurality of colors including red (R), green (G) and blue (B) in correspondence with a plurality of subpixels.

Each of the plurality of pixels includes a first subpixel for emitting a light (hereinafter, referred to as a "red light") of a wavelength region corresponding to R, a second subpixel for emitting a light (hereinafter, referred to as a "green light") of a wavelength region corresponding to G, and a third subpixel for emitting light (hereinafter, referred to as a "blue light") of a wavelength region corresponding to B, and displays a specific color by a combination of the red light, the green light and the blue light respectively emitted from the first to third subpixels. At this time, in correspondence with the first to third subpixels, the direction of the liquid crystal cell is changed by an electric field formed in the liquid crystal layer between pixel electrodes and common electrodes during one frame, thereby adjusting light transmittance. That is, the luminance of the light emitted from each subpixel (that is, light transmittance) may be adjusted by the intensity of the electric field formed in the liquid crystal layer between the pixel electrode and the common electrode.

FIG. 1 shows the respective voltage-transmittance curves of a red light, a green light, a blue light and a white light in a general LCD device.

As shown in FIG. 1, each of the red light Red, the green light Green, the blue light Blue and the white light White has light transmittance (denoted on a vertical axis of FIG. 1) which changes according to the voltage (denoted on a horizontal axis of FIG. 1) for determining the intensity of the electric field. In FIG. 1, the voltage-transmittance curve of the white light White is denoted by a dashed line, the voltage-transmittance curve of the red light Red is denoted by a dotted line, the voltage-transmittance curve of the green light Green is denoted by a solid line, and the voltage-transmittance curve of the blue light Blue is denoted by a dashed dotted line.

The color of the light emitted from each subpixel depends on a material configuring the color filter layer through which the light passes. That is, since the light emitted from each subpixel passes through the color filter layer including a material transmitting a light of a wavelength region corresponding to the color thereof, the color and the voltage-transmittance curve are changed according to the material of the color filter layer.

In the general LCD device, as shown in FIG. 1, the respective voltage-transmittance curves of the red light, the green light, the blue light and the white light have different forms. In detail, if the driving voltage is a first voltage (1), the red light has maximum transmittance, but the green light, the blue light and the white light have transmittances lower than the maximum transmittance. If the driving voltage is a second voltage (2), the blue light has maximum transmittance, but the red light, the green light and the white light have transmittances lower than the maximum transmittance. In addition, the green light has maximum transmittance at a voltage between the first voltage (1) and the second voltage (2).

As described above, using the color filter layer including different materials according to the color of the emitted light, the voltage-transmittance curve of the light emitted from each subpixel is changed according to colors. Since the voltage-transmittance curves of the red light, the green light and the white light are relatively similar to one another, a third voltage (3) for enabling the emission of the red light, the green light and the white light with relatively high transmittances is generally selected as the driving voltage. However, if the third voltage (3) is used as the driving voltage, the red light, the green light and the white light have relatively high transmittance, but the blue light has transmittance lower than those of the red light, the green light and the white light. Therefore, if the driving voltage is set to the third voltage (3), it is difficult to implement maximum luminance of the blue light. In addition, since the amount of emitted blue light is less than those of the other colors at the same voltage, the display of the pixel becomes inaccurate by the insufficient amount of the blue light and thus image quality deteriorates.

In the related art, subpixels for emitting the red light, the green light and the white light are driven by a driving circuit using the third voltage (3) as the driving voltage, and the subpixels for emitting the blue light are driven by a driving circuit using the second voltage (2) as the driving voltage, separately from the subpixels for emitting the red light, the green light and the white light. That is, since the driving circuit for driving the subpixels for emitting the blue light is included separately from the driving circuit for driving the subpixels for emitting the red light, the green light and the white light, the manufacturing costs of the LCD device are increased.

SUMMARY OF THE INVENTION

Accordingly, the present invention is directed to a liquid crystal display device that substantially obviates one or more problems due to limitations and disadvantages of the related art.

An object of the present invention is to provide a liquid crystal display device, which is capable of reducing manufacturing costs, by enabling lights of different colors emitted from a plurality of subpixels to have similar voltage-transmittance curves and driving the plurality of subpixels using the same circuit regardless of the color of emitted light.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device includes first and second substrates facing each other, a liquid crystal layer filled between the first and second substrates, a first common electrode formed in a first pixel region on the first substrate in correspondence with a first subpixel for emitting a light of a first color, and having a first area, wherein a common voltage is applied to the first common electrode, and a second common electrode formed in a second pixel region on the first substrate in correspondence with a second subpixel for emitting light of a second color different from the first color and having a second area different from the first area, wherein the common voltage is applied to the second common electrode.

In another aspect of the present invention, a liquid crystal display device includes first and second substrates facing each other, a liquid crystal layer filled between the first substrate and the second substrate, gate lines and data lines arranged to cross each other such that a plurality of pixel regions respectively corresponding to a plurality of subpixels is defined on the first substrate, a plurality of transistors respectively arranged in regions formed by crossing the gate lines and the data lines and respectively corresponding to the plurality of subpixels, a plurality of pixel electrodes respectively formed in the plurality of pixel regions on the first substrate and respectively connected to the plurality of transistors, wherein pixel voltages respectively corresponding to the plurality of subpixels are respectively supplied to the plurality of pixel electrodes, an insulating layer covering the plurality of pixel electrodes, and a plurality of common electrodes respectively formed in the plurality of pixel regions on the insulating layer in a toothed shape, wherein common voltages corresponding to the plurality of subpixels are applied to the plurality of common electrodes. The plurality of subpixels includes a first subpixel for emitting a light of a first color and a second subpixel for emitting a light of a second color different from the first color, and wherein a first common electrode formed in a first pixel region corresponding to the first subpixel has an area different from that of a second common electrode formed in a second pixel region corresponding to the second subpixel.

As described above, the liquid crystal display device of the present invention includes the first common electrode formed in the pixel region of the first subpixel for emitting the light of the first color and having the first area and the second common electrode formed in the pixel region of the second subpixel for emitting the light of the second color and having the second area greater than the first area. The intensity of the electric field formed by the second common electrode may be greater than that of the electric field formed by the first common electrode Accordingly, even when the first subpixel and the second subpixel are driven by the same driving circuit, the light of the first color and the light of the second color have similar voltage-transmittance curves. Therefore, it is not necessary to include a separate driving circuit and thus it is possible to reduce the manufacturing costs of the liquid crystal display device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, Liquid Crystal Display (LCD) devices according to the embodiments of the present invention will be described in detail with reference to the accompanying drawings.

Figure 2:
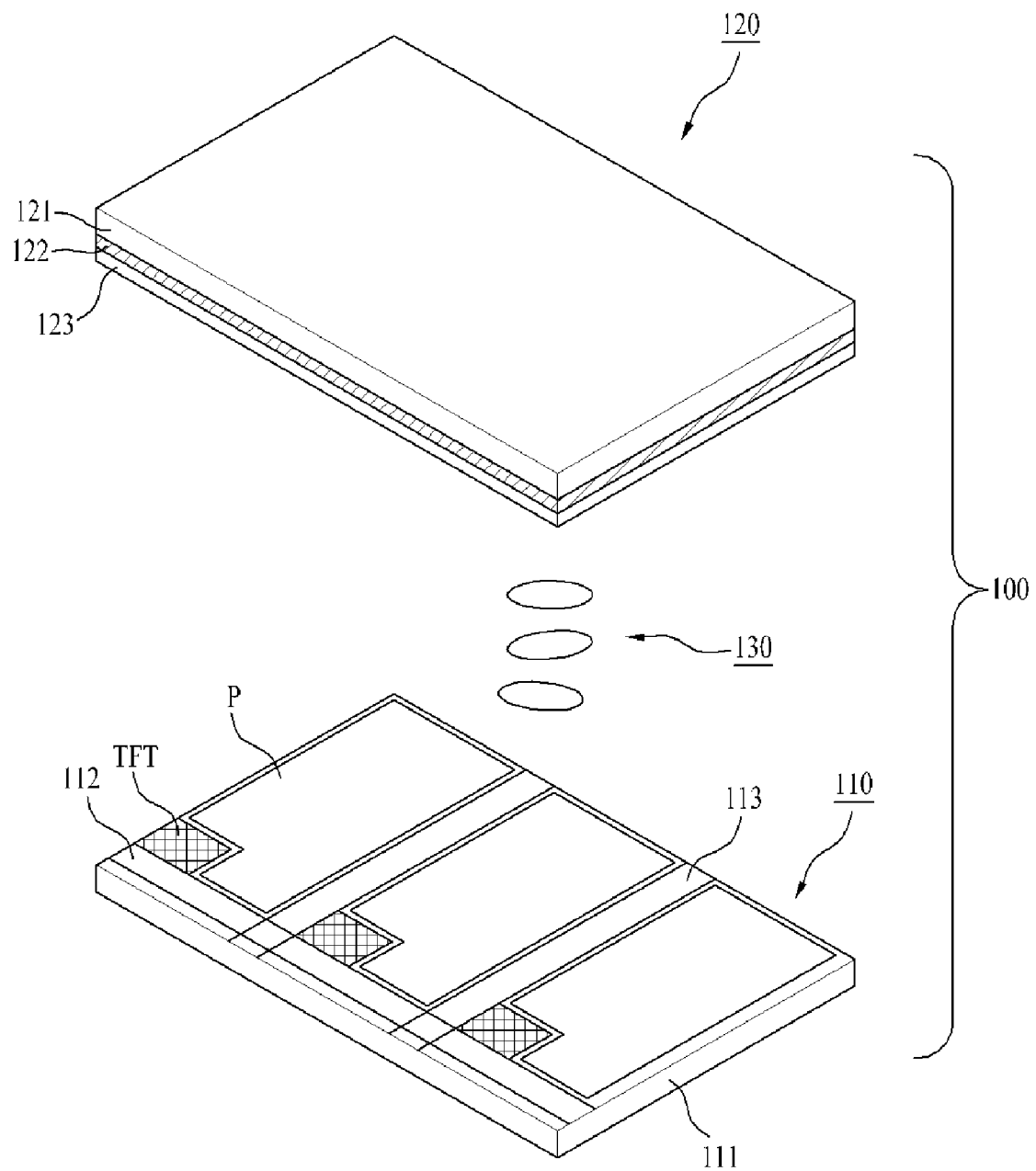
FIG. 2 is a perspective view showing an LCD device according to an embodiment of the present invention.
Figure 3:
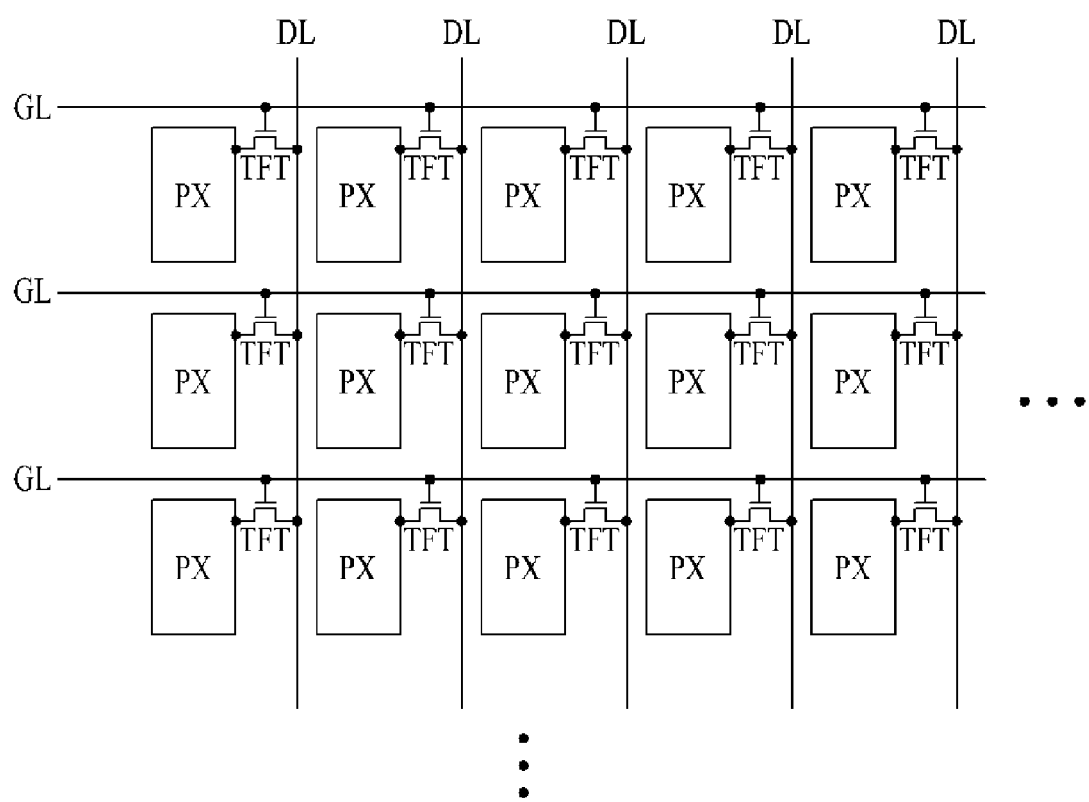
FIG. 3 is an equivalent circuit diagram of the LCD device shown in FIG. 2.
Figure 4:
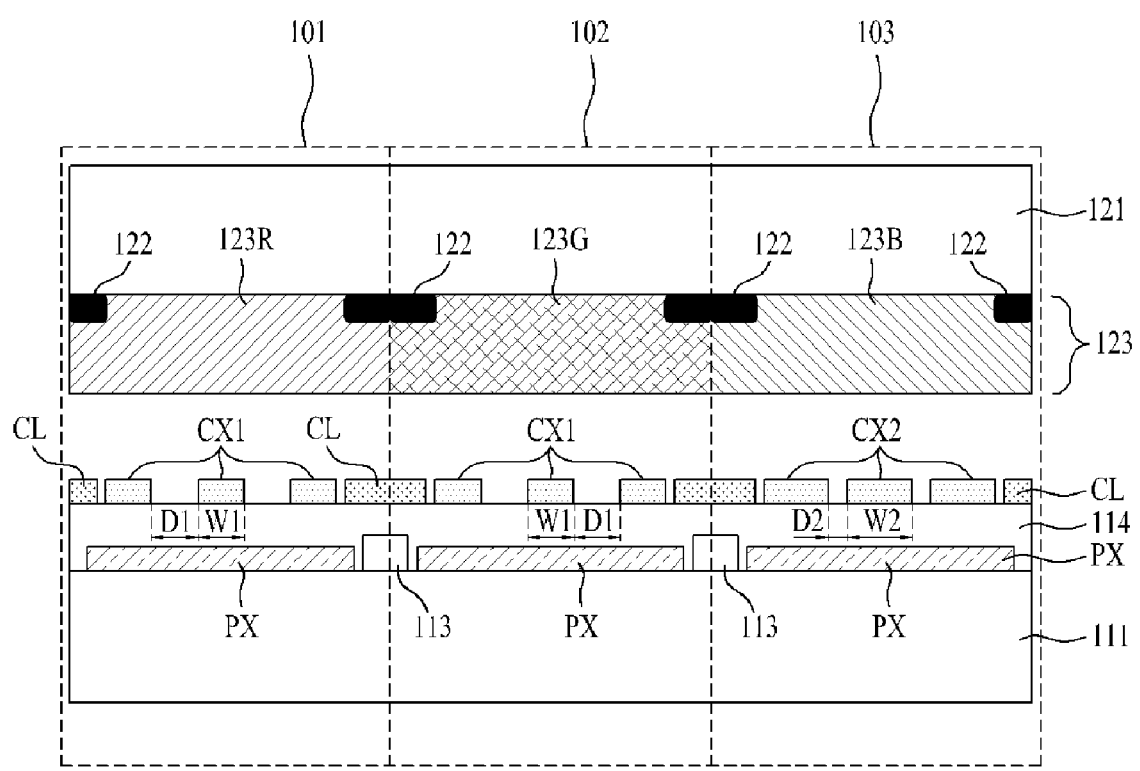
FIG. 4 is a cross-sectional view showing first to third subpixels for emitting lights of first to third colors in the LCD device according to the embodiment of the present invention.

FIG. 2 is a perspective view showing an LCD device according to an embodiment of the present invention, FIG. 3 is an equivalent circuit diagram of the LCD device shown in FIG. 2, and FIG. 4 is a cross-sectional view showing first to third subpixels for emitting light of first to third colors in the LCD device according to the embodiment of the present invention.

First, the LCD device according to the embodiment of the present invention includes a plurality of pixels, and displays specific colors on a per pixel basis so as to display a color image. Each pixel includes a plurality of subpixels, and each subpixel emits light within a wavelength region corresponding to any one of a plurality of colors including at least red (R), green (G) and blue (B). That is, each pixel displays a specific color obtained by mixing lights of different colors emitted from the plurality of subpixels. Hereinafter, the LCD device according to the embodiment of the present invention including a plurality of pixels each including a first subpixel for emitting light (hereinafter, referred to as "red light") within a wavelength region corresponding to red (R), a second subpixel for emitting light (hereinafter, referred to as "green light") within a wavelength region corresponding to green (G) and a third subpixel for emitting light (hereinafter, referred to as a "blue light") with a wavelength region corresponding to blue (B) will be described.

As shown in FIG. 2, the LCD device 100 according to the embodiment of the present invention includes a lower substrate 110 and an upper substrate 120 facing each other, and a liquid crystal layer 130 filled a space the lower substrate 110 and the upper substrate 120. If the LCD device 100 is a transmissive type or transflective type non light emitting device, the LCD device may further include a backlight unit for supplying light.

The lower substrate 110 includes a first support substrate 111, gate lines 112 and data lines 113 disposed on the first support substrate 111 so as to cross each other, Thin Film Transistors (TFTs) respectively disposed in regions formed by the gate lines 112 and the data lines 113 so as to control the transmittances of a plurality of pixel regions P, and pixel electrodes and common electrodes formed in each pixel region P. The upper substrate 120 includes a second support substrate 121, a black matrix layer 122 formed outside the plurality of pixel regions on the second support substrate 121 so as to block light leakage from the outside of the pixel regions, and a color filter layer 123 for transmitting light within a wavelength region corresponding to any one of red, green and blue in correspondence with each pixel region.

In each subpixel, the TFT includes a gate connected to the gate line GL, a source connected to the data line DL, and a drain connected to the pixel electrode PX, as shown in FIG. 3. The TFT is turned on or off according to a gate signal of the gate line GL, and, upon being turned on, applies a pixel voltage to the pixel electrode PX according to a data signal of the data line DL. The pixel electrode PX to which the pixel voltage is applied forms an electric field with common electrodes (not shown) to which common voltages are applied. The direction of the liquid crystal cell of the liquid crystal layer 130 is changed according to the electric field so as to adjust transmittance of light passing through the liquid crystal layer 130, such that the light transmittance of each subpixel is determined. That is, since the light transmittance of each subpixel depends on the direction of the liquid crystal cell and the direction of the liquid crystal cell depends on the intensity of the electric field generated between the pixel electrode PX and the common electrode, the light transmittance is changed according to the intensity of the electric field. In addition, the intensity of the electric field is proportional to a voltage difference between the pixel electrode and the common electrode or the area of the pixel electrode or the common electrode. According to the characteristics of each subpixel (hereinafter, referred to as "voltage-transmittance characteristics"), transmittance changes according to the pixel voltage.

Each subpixel emits light within a wavelength region corresponding to any one of the plurality of colors including red (R), green (G) and blue (B) through the color filter layer 123. At this time, a dye or fluorescent material included in the color filter layer 123 is changed according to the wavelength region of the transmitted light, that is, the color of the transmitted light, and the transmittance is changed according to the color of the light.

According to the embodiment of the present invention, the area occupied by the pixel electrode or the common electrode in the pixel region P is adjusted such that the light emitted from each of the plurality of subpixels has similar voltage-transmittance curves.

Figure 1:
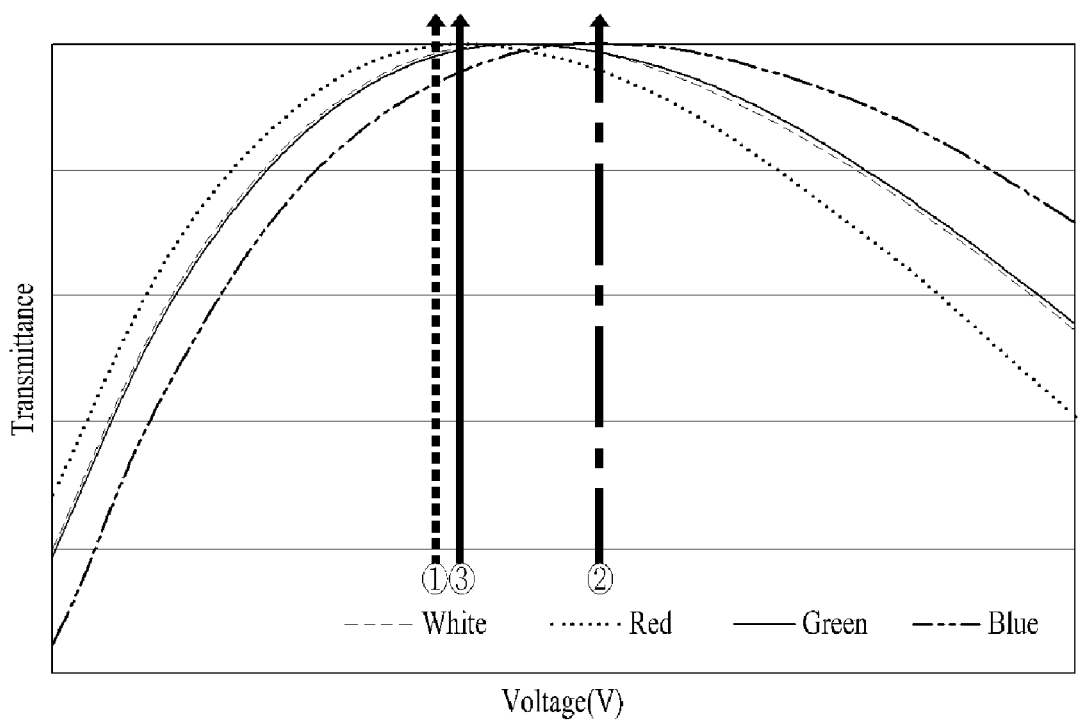
FIG. 1 is a diagram showing the respective voltage-transmittance curves of a red light, a green light, a blue light and a white light in a general Liquid Crystal Display (LCD) device.

As shown in FIG. 4, each subpixel includes a first subpixel 101 for emitting red light, a second subpixel 102 for emitting green light, and a third subpixel for emitting blue light. It is assumed that the red light and the green light have similar voltage-transmittance characteristics and the blue light has voltage-transmittance characteristics different from those of the red light or the green light. In particular, as shown in FIG. 1, it is assumed that, assuming that all subpixels have the same structure, maximum transmittance of blue light is achieved at a higher voltage than in the case of the red light or the green light.

As shown in FIG. 4, the first sub pixel 101 for emitting red light includes the pixel electrode PX formed in the pixel region on the first support substrate 111, an insulating layer 114 surrounding the pixel electrode PX, a first common electrode CX1 formed on the insulating layer 114, having a first width W1, and including a plurality of toothed electrodes spaced apart from each other by a first distance D1, a common line CL formed on the insulating layer 114 so as to overlap at least a part of the data line 113 and connected to the first common electrode CX so as to apply the common voltage, the black matrix layer 122 formed outside the pixel region on the second support substrate 121, and a color filter layer 123R overlapping at least a part of the black matrix layer 122 and transmitting the light (red light) of the wavelength region corresponding to red (R).

The second subpixel 102 for emitting green light is identical to the first subpixel 101 except that a color filter layer 123G for transmitting the light (green light) of the wavelength region corresponding to green (G) is included. Accordingly, further description thereof will be omitted.

The third subpixel 103 for emitting the blue light includes the pixel electrode PX formed in the pixel region on the first support substrate 111, an insulating layer 114 surrounding the pixel electrode PX, a second common electrode CX2 formed on the insulating layer 114, having a second width W2 greater than the first width W1, and including a plurality of toothed electrodes spaced apart from each other by a second distance D2 less than the first distance D1, a common line CL formed on the insulating layer 114 so as to overlap at least a part of the data line 113 and connected to the first and second common electrodes CX1 and CX2 so as to apply the common voltage, the black matrix layer 122 formed outside the pixel region on the second support substrate 121, and a color filter layer 123B overlapping at least a part of the black matrix layer 122 and transmitting the light (blue light) of the wavelength region corresponding to blue (B).

Figure 5A:
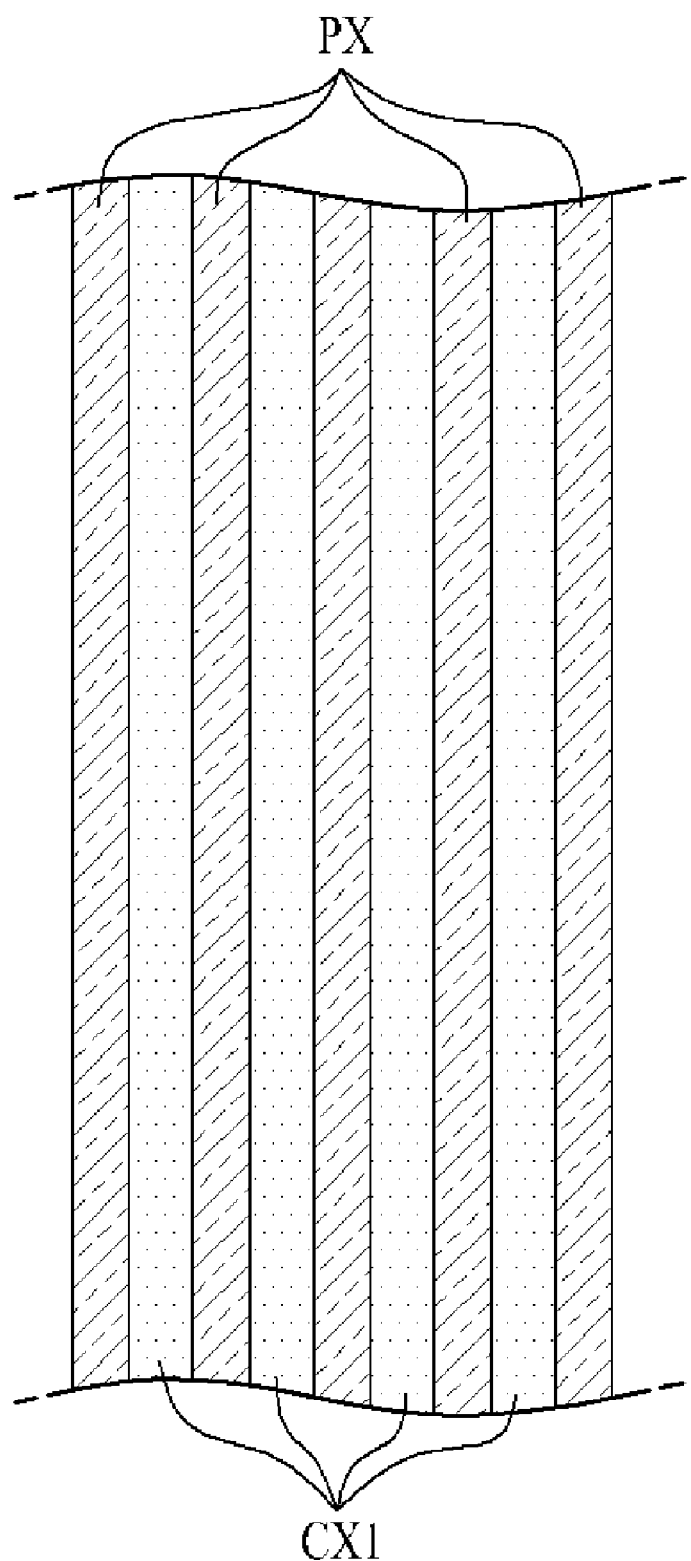
FIG. 5A is a plan view showing a part of a pixel region of a first subpixel according to a first embodiment of the present invention.
Figure 5B:
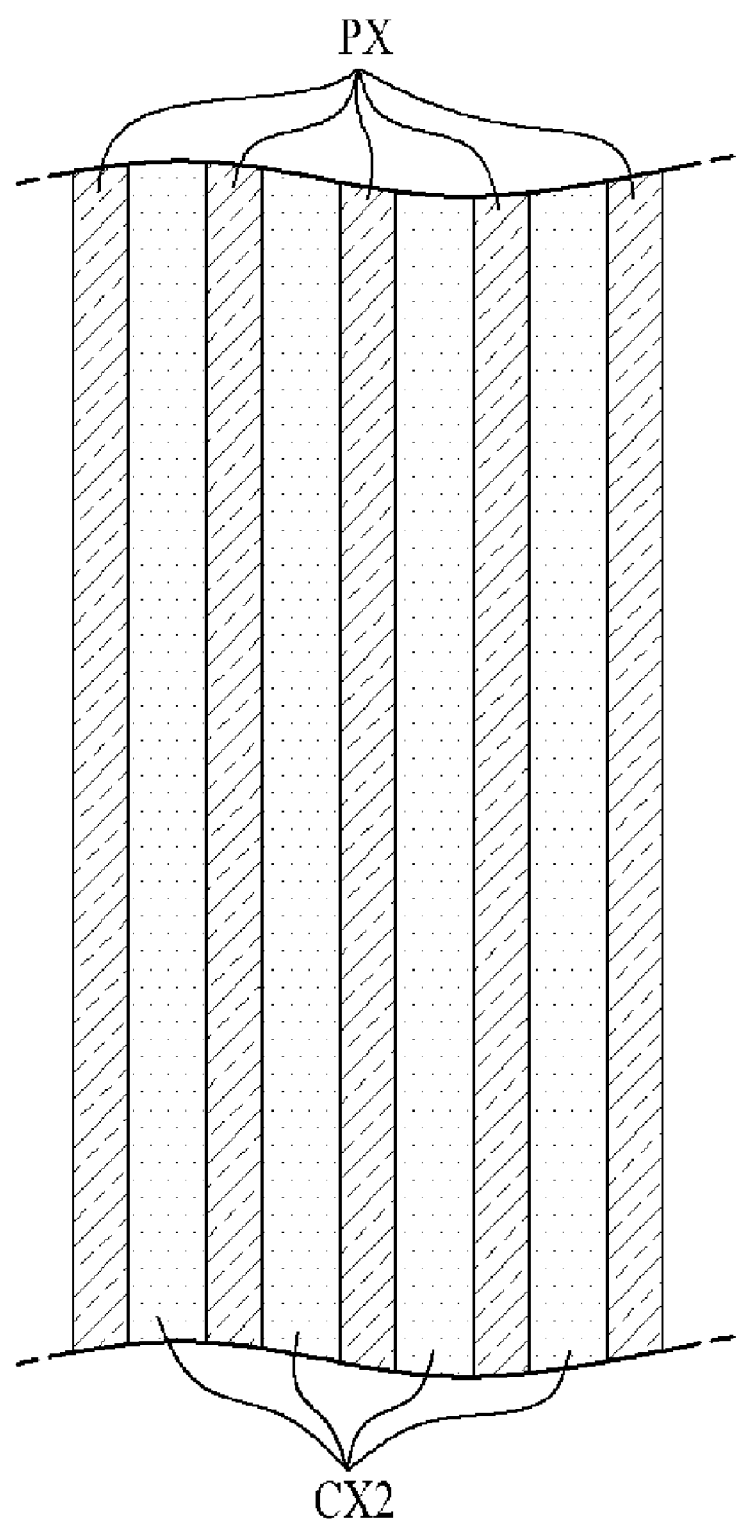
FIG. 5B is a plan view showing a part of a pixel region of a third subpixel according to the first embodiment of the present invention.
Figure 6:
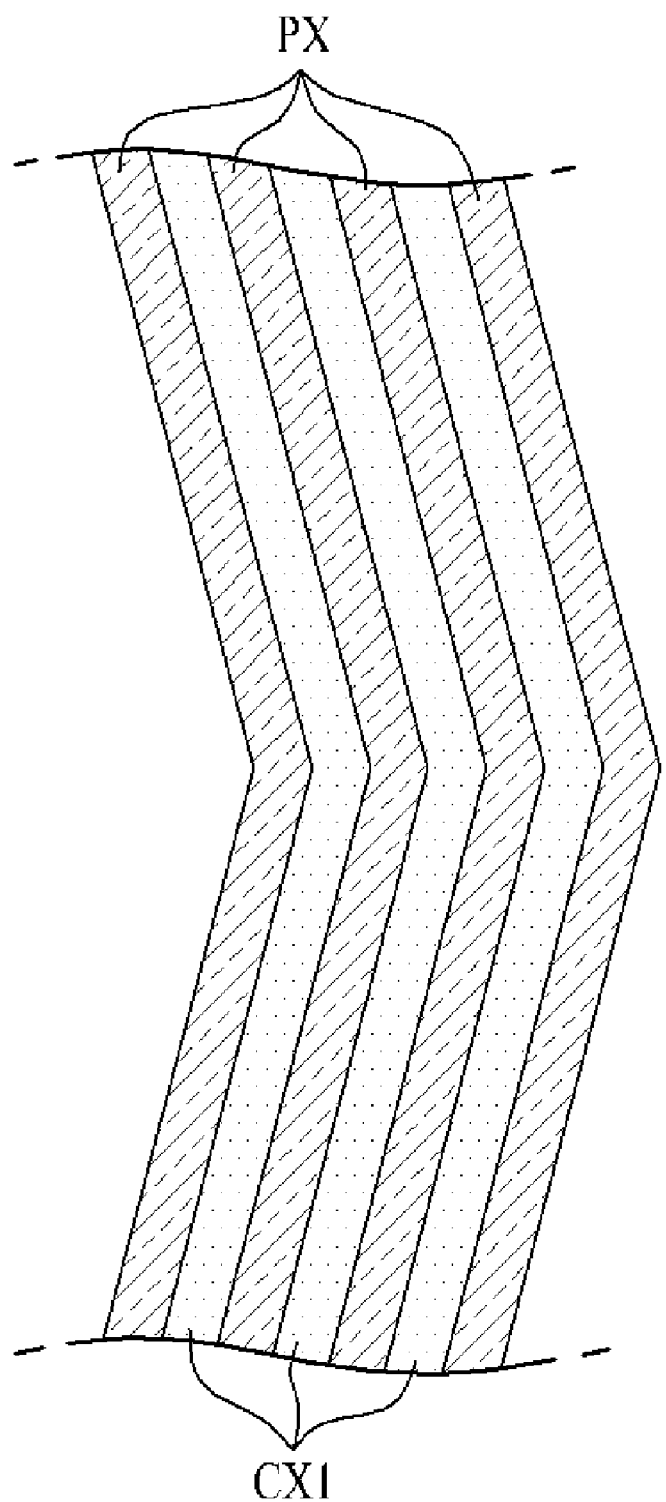
FIG. 6 is a plan view showing a part of a pixel region of a third subpixel according to a second embodiment of the present invention.

The first common electrode CX1 included in the first or second sub pixel 101 or 102 for emitting the red light or the green light has the first width W1 and includes the plurality of toothed electrodes spaced apart from each other by the first distance D1. The second common electrode CX2 included in the third subpixel 103 for emitting the blue light has the second width W2 greater than the first width W1 and includes the plurality of toothed electrodes spaced apart from each other by the second distance D2, which is less than the first distance D1. As shown in FIGS. 5A and 5B, the second common electrode CX2 has an area greater than that of the first common electrode CX1 such that the electric field generated between the second common electrode CX2 and the pixel electrode PX is greater than the electric field generated between the first common electrode CX1 and the pixel electrode PX. Accordingly, even when the voltage level of the pixel electrode PX is the same, the electric field generated in the third subpixel 103 has a significant influence upon the liquid crystal layer 130, compared with the electric field generated in the first or second subpixel 101 or 102.

In order to differentiate the intensities of the electric fields areas according to differential of the areas of the first and second common electrodes, the second common electrode CX2 has a greater area than the first common electrode CX1 by a difference corresponding to at least 15% of the area of the first common electrode CX1. If the area of the second common electrode CX2 is too large, transmittance may be lowered. Thus, the second common electrode CX2 has an area greater than that of the first common electrode CX1 by a difference corresponding to less than 35% of the area of the first common electrode CX1. That is, the difference between the area of the first common electrode CX1 and the area of the second common electrode CX2 is set to be greater than 15% or less than 35% of the area of the first common electrode CX1.

For example, the second width W2 of the second common electrode CX2 may be selected from 2 μm to 9 μm. Since the area of the second common electrode CX2 may be 115%-135% times as large as the area of the first common electrode CX1, the second width W2 may be 115%-135% times as great as the first width W1. Accordingly, the first width W1 of the first common electrode CX1 may be selected from 1.481 μm (=2 μm/1.35) to 7.826 μm (=9 μm/1.15) corresponding to the second width W2 selected from 2 μm to 9 μm.

In other words, referring to a large sized device, a maximum of the second width W2 may be selected 9 μm, thus the first width W1 may be selected from 6.666 μm (=9 μm/1.35) to 7.826 μm (=9 μm/1.15). Referring to a small sized device, the second width W2 may be selected from 2 μm to 4 μm, thus the first width W1 may be selected from 1.481 μm (=2 μm/1.35) to 3.478 μm (=4 μm/1.15).

Although the first and second common electrodes CX1 and CX2 each including the plurality of toothed electrodes having a straight line shape are shown in FIGS. 5A and 5B, the first common electrode CX1 may include a plurality of toothed electrodes each of which is bent in a V shape such that the bend angle of the center thereof becomes an obtuse angle. Similar to the first common electrode CX1, the second common electrode CX2 and the data line DL are bent at the center of the pixel region such that the angle of the center thereof becomes obtuse.

As described above, according to the embodiment of the present invention, the first common electrode CX1 included in the first subpixel 101 or the second subpixel 102 for emitting the red light or the green light and the second common electrode CX2 included in the third subpixel 103 for emitting the blue light have different areas such that the influence of the electric field on the liquid crystal layer 130 is changed. Thus, the red light, the green light and the blue light have similar voltage-transmittance characteristics.

Figure 7:
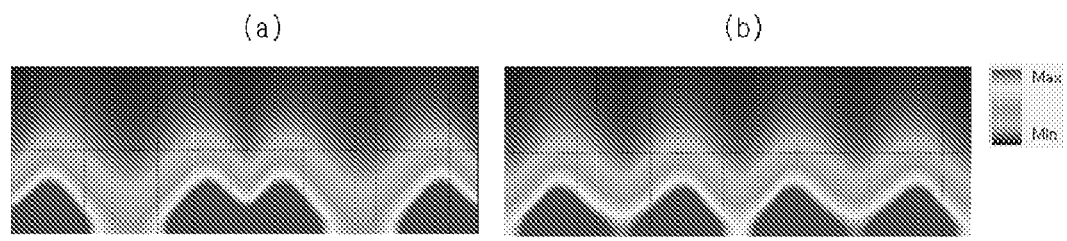
FIG. 7 is a diagram showing an electric field of a first or second subpixel and an electric field of a third subpixel driven by the same driving circuit, in an LCD device according to an embodiment of the present invention.
Figure 8:
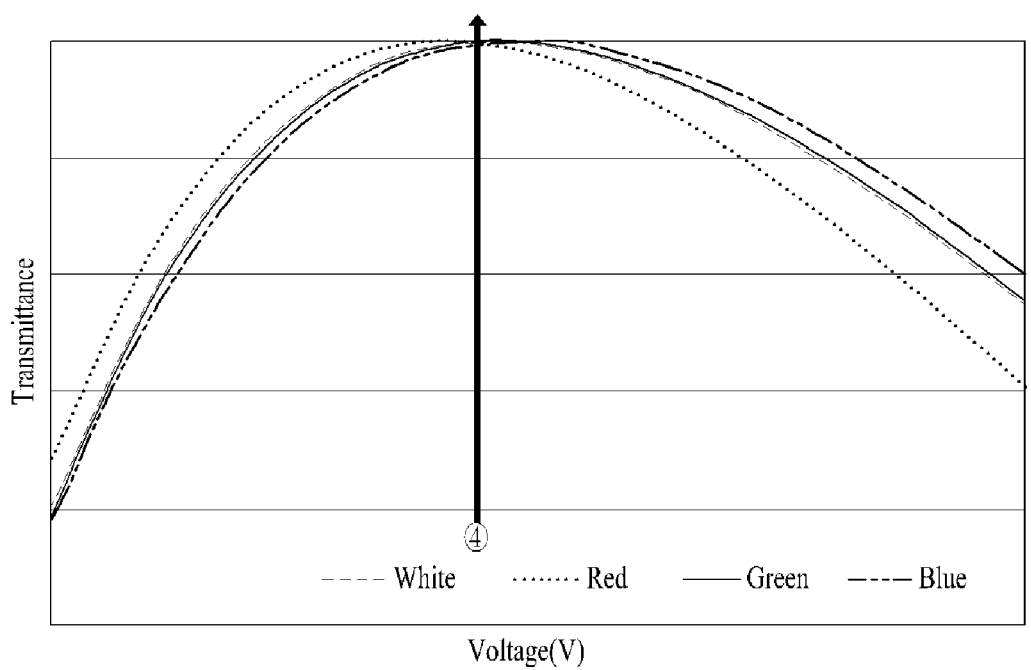
FIG. 8 is a diagram showing the respective voltage-transmittance curves of a red light, a green light, a blue light and a white light in an LCD device according to an embodiment of the present invention.

FIG. 7 is a diagram showing an electric field of a first or second subpixel and an electric field of a third subpixel driven by the same driving circuit, in an LCD device according to an embodiment of the present invention, FIG. 8 is a diagram showing the respective voltage-transmittance curves of a red light, a green light, a blue light and a white light in an LCD device according to an embodiment of the present invention.

FIG. 7(a) is a diagram showing an electric field formed by the first common electrode CX1 and FIG. 7(b) is a diagram showing an electric field formed by the second common electrode CX2 having an area greater than that of the first common electrode CX1.

From comparison between FIG. 7(a) and FIG. 7(b), it can be seen that a maximum electric field region Max represented by a red color of FIG. 7(b) is wider than that of FIG. 7(a) at the same voltage difference. That is, it can be seen that the influence of the electric field formed by the second common electrode CX2 on the liquid crystal layer 130 is greater than that of the electric field formed by the first common electrode CX1.

As shown in FIG. 8, the red light Red, the green light Green and the blue right Blue respectively emitted from the first to third subpixels 101 to 103 have similar voltage-transmittance characteristics. In FIG. 8, each of the red light Red, the green light Green, the blue light Blue and the white light White has light transmittance (the vertical axis in FIG. 8) which is changed according to a voltage (the horizontal axis in FIG. 8) for determining the intensity of the electric field. In FIG. 8, the voltage-transmittance curve corresponding to the white light White is denoted by a dashed line, the voltage-transmittance curve corresponding to the red light Red is denoted by a dotted line, the voltage-transmittance curve corresponding to the green light Green is denoted by a solid line, and the voltage-transmittance corresponding to the blue light Blue is denoted by a dashed dotted line.

That is, the red light Red, the green light Green, the blue light Blue have high transmittance at the same driving voltage (4). Therefore, since the light transmittance of each subpixel according to the voltage is similarly changed regardless of the color of the emitted light, it is not necessary to perform a unique and complex control procedure for specific colors, the luminance of which is less than that of the lights of the other colors, and to drive some subpixels using a separate driving circuit. Accordingly, it is possible to reduce the manufacturing costs of the LCD device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
first and second substrates facing each other;
a liquid crystal layer filled between the first and second substrates;
a first common electrode formed in a first pixel region on the first substrate in correspondence with a first subpixel for emitting a light of a first color, and having a first area, wherein a common voltage is applied to the first common electrode; and
a second common electrode formed in a second pixel region on the first substrate in correspondence with a second subpixel for emitting light of a second color different from the first color and having a second area different from the first area, wherein the common voltage is applied to the second common electrode,
wherein:
the first color is red or green and the second color is blue, and
the second area is larger than the first area.

2. The liquid crystal display device according to claim 1, further comprising a color filter layer formed on the second substrate, transmitting the light of the first color in the first pixel region in correspondence with the first subpixel, and transmitting the light of the second color in the second pixel region in correspondence with the second subpixel.

3. The liquid crystal display device according to claim 1, wherein a difference between the first area and the second area is greater than 15% or less than 35% of the second area.

4. The liquid crystal display device according to claim 3, wherein:
the first common electrode includes a first toothed electrode and a second toothed electrode spaced apart from each other by a first distance, and
the second common electrode includes a third toothed electrode and a fourth toothed electrode spaced apart from each other by a second distance less than the first distance.

5. The liquid crystal display device according to claim 3, wherein:
the first common electrode includes a plurality of toothed electrodes having a first width; and
the second common electrode includes a plurality of toothed electrodes having a second width greater than the first width.

6. The liquid crystal display device according to claim 5, wherein:
the second width is selected from 2μm to 9μm, which is 115%-135% times as great as the first width.

7. A liquid crystal display device comprising:
first and second substrates facing each other;
a liquid crystal layer filled between the first substrate and the second substrate;
gate lines and data lines arranged to cross each other such that a plurality of pixel regions respectively corresponding to a plurality of subpixels is defined on the first substrate;
a plurality of transistors respectively arranged in regions formed by crossing the gate lines and the data lines and respectively corresponding to the plurality of subpixels;
a plurality of pixel electrodes respectively formed in the plurality of pixel regions on the first substrate and respectively connected to the plurality of transistors, wherein pixel voltages respectively corresponding to the plurality of subpixels are respectively applied to the plurality of pixel electrodes;
an insulating layer covering the plurality of pixel electrodes; and
a plurality of common electrodes respectively formed in the plurality of pixel regions on the insulating layer in a toothed shape, wherein common voltages corresponding to the plurality of subpixels are applied to the plurality of common electrodes,
wherein the plurality of subpixels includes a first subpixel for emitting light of a first color and a second subpixel for emitting light of a second color different from the first color, and
wherein a first common electrode formed in a first pixel region corresponding to the first subpixel has an area different from that of a second common electrode formed in a second pixel region corresponding to the second subpixel, or a first pixel electrode formed in a first pixel region corresponding to the first subpixel has an area different from that of a second pixel electrode formed in a second pixel region corresponding to the second subpixel,
wherein the first color is red or green and the second color is blue, and
wherein the second common electrode has an area greater than that of the first common electrode.

8. The liquid crystal display device according to claim 7, wherein a difference between the area of the first common electrode and the area of the second common electrode is greater than 15% or less than 35% of the second common electrode.

9. The liquid crystal display device according to claim 7, wherein:
the first common electrode includes a plurality of toothed electrodes having a first width; and
the second common electrode includes a plurality of toothed electrodes having a second width greater than the first width, and
wherein the second width is selected from 2μm to 9μm, which is 115%-135% times as great as the first width.

* * * * *